(12) United States Patent
Liang et al.

(10) Patent No.: US 12,474,895 B1
(45) Date of Patent: Nov. 18, 2025

(54) LOCAL SYSTEM ENVIRONMENT FOR CLOUD BASED DEVELOPMENT

(71) Applicant: Anyscale, Inc., San Francisco, CA (US)

(72) Inventors: Eric Liang, Berkeley, CA (US); Philipp Moritz, San Francisco, CA (US); Sofian Hnaide, San Francisco, CA (US)

(73) Assignee: Anyscale, Inc., San Francisco, CA (US)

( * ) Notice: Subject to any disclaimer, the term of this patent is extended or adjusted under 35 U.S.C. 154(b) by 199 days.

(21) Appl. No.: 18/214,360

(22) Filed: Jun. 26, 2023

(51) Int. Cl.
*G06F 8/20* (2018.01)
*G06F 8/33* (2018.01)
*G06F 8/34* (2018.01)
*G06F 9/455* (2018.01)
*G06F 9/50* (2006.01)
*G06F 11/14* (2006.01)
*G06F 11/36* (2025.01)
*H04L 9/40* (2022.01)
*G06F 8/30* (2018.01)
*G06F 8/36* (2018.01)
*G06F 8/41* (2018.01)
*G06F 8/60* (2018.01)
*G06F 8/61* (2018.01)
*G06F 8/65* (2018.01)
(Continued)

(52) U.S. Cl.
CPC .............. *G06F 8/34* (2013.01); *G06F 8/20* (2013.01); *G06F 8/311* (2013.01); *G06F 8/36* (2013.01); *G06F 8/433* (2013.01); *G06F 8/60* (2013.01); *G06F 8/61* (2013.01); *G06F 8/63* (2013.01); *G06F 8/65* (2013.01); *G06F 8/71* (2013.01); *G06F 9/4401* (2013.01); *G06F 9/445* (2013.01); *G06F 9/453* (2018.02); *G06F 9/45558* (2013.01); *G06F 9/5044* (2013.01); *G06F 9/505* (2013.01); *G06F 11/1464* (2013.01); *G06F 11/3688* (2013.01)

(58) Field of Classification Search
CPC ..... G06F 8/34; G06F 8/20; G06F 8/63; G06F 8/433; G06F 8/61; G06F 8/311; G06F 8/65; G06F 8/60; G06F 8/71; G06F 8/36; G06F 11/3664; G06F 11/3688; G06F 11/1464; G06F 9/505; G06F 9/5044; G06F 9/453; G06F 9/45558; G06F 9/4401; G06F 9/445
See application file for complete search history.

(56) References Cited

U.S. PATENT DOCUMENTS 10,938,641 B1 * 3/2021 Fritz .................. H04L 63/04
11,838,296 B1 * 12/2023 Rossman .............. H04L 63/20
(Continued)

*Primary Examiner* — Anibal Riveracruz
(74) *Attorney, Agent, or Firm* — Van Pelt, Yi & James LLP

(57) ABSTRACT

A system, device, and method for providing a development environment for a client system that runs on a cluster is disclosed. The method includes (i) starting the cluster from the client system to run the development environment, wherein starting the cluster includes instantiating the cluster based on a predefined cluster image, and configuring a set of dependencies for the cluster, wherein the set of dependencies includes a mounting for a network file storage, (ii) receiving, via the development environment, code input to an interface with the client system, (iii) determining to execute the code, and (iv) in response to determining to execute the code, executing the code using the cluster including automatically scaling the cluster based on a workload for executing the code.

23 Claims, 11 Drawing Sheets

(51) Int. Cl.
*G06F 8/71* (2018.01)
*G06F 9/4401* (2018.01)
*G06F 9/445* (2018.01)
*G06F 9/451* (2018.01)
*G06F 11/3668* (2025.01)

(56) References Cited

U.S. PATENT DOCUMENTS

2017/0177877 A1* 6/2017 Suarez ................ G06F 21/6218
2017/0300386 A1* 10/2017 Shulga ................ G06F 11/1438
2018/0324204 A1* 11/2018 McClory ............... G06F 9/5027
2019/0188047 A1* 6/2019 Dao .................... G06F 11/3698

* cited by examiner

LOCAL SYSTEM ENVIRONMENT FOR CLOUD BASED DEVELOPMENT

BACKGROUND OF THE INVENTION

Traditional software development often requires developers to have dedicated hardware and software resources locally installed on their machines. This approach poses several challenges, such as the need for frequent software updates, hardware compatibility issues, and limited scalability. Developers often encounter difficulties in managing the installation and configuration of various development tools and dependencies across different operating systems, which can lead to inconsistencies and time-consuming troubleshooting processes. Additionally, the reliance on local hardware restricts the accessibility and mobility of developers, as they are bound to a specific physical location to carry out their work. Furthermore, collaboration between geographically dispersed team members becomes cumbersome, as coordinating software versions and configurations becomes a complex and error-prone task.

BRIEF DESCRIPTION OF THE DRAWINGS

Various embodiments of the invention are disclosed in the following detailed description and the accompanying drawings.

DETAILED DESCRIPTION

Figure 1:
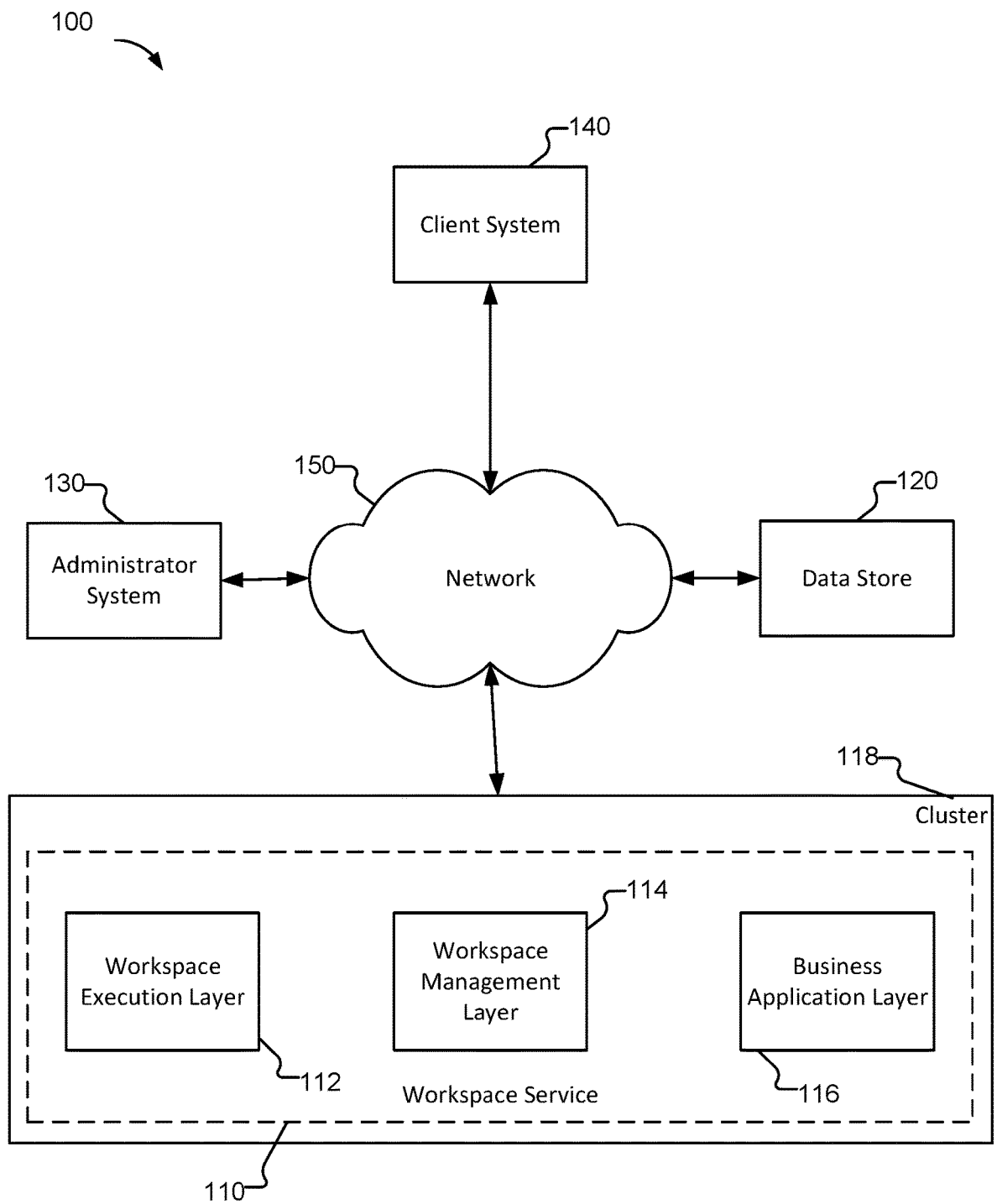
FIG. 1 is a block diagram of a system for providing a development environment according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a git may include a version control system, such as a system for managing source code and tracking changes in software development projects.

As used herein, a working directory may include the main directory in which users interact with files in connection with developing/testing code. Files in the working directory can be modified, added, or deleted.

Several attempts have been made to address the aforementioned challenges by providing remote access to development environments. Some solutions utilize virtual private networks (VPNs) to establish a secure connection to a machine and then running an existing development environment on that machine. However, these solutions often suffer from performance issues.

Other existing solutions provide cloud-based development environments, where developers can remotely access a pre-configured development environment hosted on cloud servers. However, these solutions typically offer limited functionality and are often optimized for specific programming languages or platforms, thereby limiting their applicability to diverse software development projects. Moreover, configuring and customizing these cloud environments to meet specific project requirements can be challenging, requiring advanced technical expertise and time-consuming setup procedures, and in some cases, may not be possible.

Various embodiments provide a system and method for provisioning a remote development environment to users, overcoming the limitations of existing solutions. The system leverages cloud computing technologies, network connectivity, and virtualization techniques to create a comprehensive development environment accessible remotely through a user-friendly interface. The system provides a workspace (e.g., the development environment) that reduces the friction for users developing and testing code.

Various embodiments provide a system, method, and device for providing a development environment for a client system that runs on a cluster. The method includes (i)

starting the cluster from the client system to run the development environment, wherein starting the cluster includes instantiating the cluster based on a predefined cluster image, and configuring a set of dependencies for the cluster, wherein the set of dependencies includes a mounting for a network file storage, (ii) receiving, via the development environment, code input to an interface with the client system, (iii) determining to execute the code, (iv) in response to determining to execute the code, executing the code using the cluster including automatically scaling the cluster based on a workload for executing the code. In some embodiments, the set of dependencies are persisted for subsequent starts of the development environment.

The remote development environment provided by the system encompasses a complete suite of software tools, libraries, compilers, and dependencies necessary for software development across multiple platforms and programming languages. The system utilizes virtualization technologies, such as containerization or virtual machines, to encapsulate the development environment, allowing users to access and utilize it remotely without the need for local installations.

The system implements a robust cloud-based infrastructure that ensures high availability, scalability, and performance. The cloud servers can host multiple instances of the development environment, each tailored to a specific user's requirements or preferences. Users can seamlessly connect to their personalized development environment through a secure network connection (e.g., using a VPN), enabling them to code, compile, debug, and deploy software applications from any location and device with internet access.

The remote development environment provisioning system includes a user-friendly web-based interface that allows developers to manage their development projects, configure development settings, and collaborate with team members. The interface provides intuitive controls and real-time feedback, facilitating an immersive development experience. The system enables the use of local (e.g., non-web based) development environment to do coding or code development and enabling execution of the code to in a cluster—not the local machine.

In some embodiments, the system implements intelligent resource allocation algorithms that dynamically allocate computing resources based on user demand. For example, the system dynamically scales up and scales down nodes in the cluster providing the development environment or processing workloads for the development environment based on the current workload of the development agreement. For example, changing available resources, such as machines of the cluster, from one to as many machines (e.g., a plurality of machines) as is appropriate to process the execution of the code from the development environment. This ensures optimal performance and scalability, allowing the system to seamlessly scale their development environments as the project requirements evolve. The system may scale the development environment (e.g., the cluster providing the development environment) in the background without contemporaneous instruction or configuration of the system for starting up or terminating a worker node. The system may also include automated software update mechanisms, ensuring that the development environment is always up to date with the latest software versions and patches.

In some embodiments, the system stores a set of dependencies associated with a development environment to a local storage/working directory, and the system uses the set of dependencies to quickly spin up additional worker nodes. The local storage/working directory may correspond to a network file system (NFS) that is mounted to the cluster (e.g., to the worker node). The various nodes within the cluster may share the local storage/working directory, thereby enabling data to be shared/accessible across the nodes, and to ensure that the data is persisted through termination or subsequent starts of the development environment.

Furthermore, the remote development environment provisioning system facilitates collaboration among developers by offering real-time collaboration features. Multiple developers can concurrently work on the same project, sharing code, and debugging sessions. The system provides seamless code synchronization and version control capabilities, allowing team members to collaborate efficiently and reducing the chances of code conflicts.

Various embodiments provide numerous advantages over existing solutions. In some embodiments, the system eliminates the need for local hardware dependencies and software installations, significantly reducing costs and compatibility issues. Developers can leverage the system's scalability to easily adapt to changing project requirements and accommodate fluctuating workloads. The system enables local code entry (e.g., using a screen, keyboard, and local cache—for example, using a chrome book locally to input code), but compiling and running of the code is done remotely.

The centralized management and maintenance of the remote development environments ensures consistent and up-to-date software configurations, eliminating the hassle of individual updates and configurations. Further, the centralized storage of dependencies and configurations allows the system to quickly access the dependencies or configurations (e.g., from the local storage or working directory) for use in spinning up or activating additional worker nodes.

An illustrative example of a user using a related art system to develop and test code, such as to train a machine learning model, includes: (a) the user downloading a model to a laptop, (b) determining how to train the model, (c) writing code in a development environment locally on the laptop, (d) causing the laptop to execute the code against a small percentage of a data set, (e) iterating the execution of the code a couple times, (f) fixing bugs in the code based on the local execution of the code, (g) determining that the code is sufficiently developed to execute against an entire dataset, such as a set of images, (h) creating a dependency to manipulate the data (e.g., to parse images), (i) downloading the dataset (e.g., a set of images on the order of 10000 images) against which the user wants to evaluate the model against, (j) determining that locally running the code against the dataset will take an extremely long time (e.g., locally running the code against a dataset on the order of 100 images may take 2 hours, and locally running the code against a dataset on the order of 10000 images may take 2-3 days), (k) determining to execute the code by a set of compute resources, (l) determining to execute the code on a compute framework that is easy to scale, such as the open source project Ray, (m) using a cloud service to spin up a cluster of compute resources (e.g., a ray cluster is set up in the remote environment), (n) determining how to connect the remote environment to the machine, including determining the configurations to be used, (o) executing the code using the cluster, (p) observing that a cluster node is failing because a dependency for the data set (e.g., the images) is not installed in the cluster (e.g., the dependency or code may not work on a type of machine, such as a machine running Linux, that is different from the laptop), (q) terminating the cluster, (r) correcting the dependency causing the cluster to fail, (s) starting the cluster again, and (t) executing the code.

In contrast to the foregoing example of a related art system, various embodiments provide a user with a pre-built machine (e.g., cluster or head node) that can be remotely accessed from a client system. The pre-built machine can run a development environment and the development environment may be persisted in association with the user identifier. A state history that identifies a user associated with a development environment may be used to fetch the state of the development environment when the previous session was terminated. The system automatically starts up the machine (e.g., a cluster) and rebuilds the development environment using the persisted state. Various embodiments thus provide a more efficient and less complex method to develop and test code.

Various embodiments improve related art systems at least because of one or more of (a) related art systems do not persist the state of an environment, thereby causing the data to be inaccessible after the machine is turned off, (b) related art systems do not have pre-built machines or templates for development environments, thereby causing the user to manually start and configure a cluster, and (c) related art systems do not provide a cluster image ready for development. Various embodiments provide a service via which users develop code directly within a development environment running on a cluster thereby eliminating the need for local code development and resolving compatibility issues when moving from running the code locally to running code on a cluster.

FIG. 1 is a block diagram of a system for providing a development environment according to various embodiments of the present application. In some embodiments, system 100 implements at least part of system 300 of FIG. 3 and/or system 400 of FIG. 4. In some embodiments, system 100 implements process 500 of FIG. 5, process 600 of FIG. 6, process 700 of FIG. 7, process 800 of FIG. 8, process 900 of FIG. 9, process 1000 of FIG. 10, and/or process 1100 of FIG. 11.

In the example illustrated in FIG. 1, system 100 includes workspace service 110 and/or data store 120. System 100 may additionally include one or more of administrator system 130, client system 140, and network 150 over which one or more of workspace service 110 as executed using cluster 118, data store 120, administrator system 130, and/or client system 140 are connected. In some embodiments, workspace service 110 is implemented by one or more servers implementing cluster 118. In various embodiments, network 150 includes one or more of a wired network and/or a wireless network such as a cellular network, a wireless local area network (WLAN), or any other appropriate network. System 100 may include various other systems or terminals.

In some embodiments, workspace service 110 provides a mechanism by which users of client system 140 may obtain a development environment, input code to the development environment, and execute the code on cluster 118 (e.g., a cluster of virtual machines) in a seamless manner in which configurations or dependencies are persisted and used to restart the development environment or to spin up new worker nodes in the cluster to handle the workload associated with executing the code. As an example, after initial configuration of the development environment running on workspace service 110, the user is not required to configure any node or scaling mechanisms of workspace service 110. The code development effectively occurs at cluster 118 using workspace service 110, thereby obviating the need to translate code developed at a local environment on client system 140 (e.g., client systems generally use different operating systems than nodes in a cluster) to properly execute on the cluster. For example, client systems often run an Apple operating system, and cluster 118 typically runs a Linux operating system. Workspace service 110 enables a user to develop code on a single machine and to seamlessly execute/test the code on a plurality of machines (e.g., a cluster comprising a plurality of worker nodes).

In some embodiments, workspace service 110 comprises workspace execution layer 112, workspace management layer 114, and/or business application layer 116. Workspace execution layer 112, workspace management layer 114, and/or business application layer 116 is/are respectively implemented by one or more servers. Workspace execution layer 112 comprises one or more clusters of compute resources or virtual machines. Workspace service 110 may provide the workspace-as-a-service to a plurality of different users or customers. For each customer/user/account, workspace execution layer 112 implements a unique or independent cluster. In some implementations, multiple users may co-develop code within a development environment provided by a particular cluster running on workspace execution layer 112.

Workspace service 110 manages the scaling of resources of cluster 118 to handle the workload of the development environment. For example, workspace execution layer 112 may automatically scale the resources of cluster 118 for a particular development environment being provided. Workspace service 110 may scale the resources of cluster 118 based at least in part on one or more of a workload for executing code within the development environment, a quality-of-service policy (e.g., a policy that may enforce the providing of the service at an indicated level of service based on the account or subscription of the user/account using the development environment), etc. In some embodiments, workspace service 110 is one of a plurality of services that executes on cluster 118.

Workspace service 110 provides a development environment to another system, such as client system 140. In some embodiments, providing the development environment includes running the development environment on cluster 118 and configuring a user interface via which the other system (e.g., client system 140) may use the development environment, such as to develop code and execute the code (e.g., test the developed code).

In response to receiving a request for a development environment (e.g., from client system 140, a user request is received to access the development environment), workspace service 110 determines whether the development environment has been previously instantiated or is to be newly instantiated, such as based on an indication provided in the request communicated to workspace service 110, or an identifier associated with a user, customer, or account corresponding to the request, etc. Workspace service 110 may obtain an identifier from the request and query a mapping of development environments (e.g., previously instantiated development environments) to identifiers or other similar indexes to determine whether the requested development environment has been previously instantiated.

In response to determining that the requested development environment has not been previously instantiated, workspace service 110 (e.g., workspace management layer 114) determines to start a new development environment. As an example, workspace service 110 (e.g., workspace management layer 114) selects a predefined image or template for the development environment to be instantiated. The predefined image/template may be selected based at least in part on (i) an indication of the particular development environment or type of development environment comprised in the request for the development environment, (ii) a mapping of development environments or types of development environments to the account (e.g., a user or customer identifier associated with the request for the development environment), and/or (iii) a selection of the development environment or type of development environment in a prompt provided by system 100 (e.g., workspace service 110 or workspace management layer 114). In response to determining the development environment or type of development environment to be instantiated, workspace service 110 obtains a corresponding image of the development environment, such as from data store 120. As an example, workspace management layer 114 provides workspace execution layer 112 with an instruction to instantiate a development environment and provides the image or template for the development environment, a location of the image on data store 120, etc. As another example, workspace management layer 114 provides workspace execution layer 112 with an instruction to instantiate a development agreement and an indication of the specific development environment (or type thereof) to be instantiated, and workspace execution layer 112 fetches the corresponding image or template.

The image or template for the development environment may be a snapshot of a containerized application or service, which includes a set of files, dependencies, and configurations used to run the application or service. As an example, the image or template may be pre-built machines specific to a type of development to be performed or for a particular customer/account. The image or template may be stored in a container registry on data store 120.

In some embodiments, the development environment is instantiated on a cluster. Each development environment instantiated by workspace service 110 may be assigned to a different or independent cluster. Because the development environment is instantiated on a cluster running on workspace service 110 and code is developed directly within the development environment (or an application on the client system 140 that syncs with the development environment), the development environment can be scaled without further configuration by the user or translation of the code to a different application or operating system, thereby simplifying the development and testing of code and making the development of code more efficient because no translation across different applications or operating systems is required.

In some embodiments, instantiating the development environment includes mounting a storage that persists through termination of the development environment and subsequent starts of the development environment. The storage may utilize a network file system (NFS) that allows the cluster (e.g., the head node, and subsequent worker nodes that are spun up) to access files and directories over a network as if the files were located on the local machine. The NFS enables file sharing across different nodes and development environment sessions. Configuring the development environment to include the mounting of the storage may include configuring the development environment with an IP address associated with the storage location. The mounting of the NFS to the development environment (e.g., to the nodes in the cluster) enables code developed within the development environment (or synced with the development environment) to be persisted through starts of the development environment and quick sharing of the data across nodes or for instantiating additional worker nodes. For example, the development environment uses the NFS as a directory to the nodes (e.g., a local directory within the development environment). The path to the NFS directory is common across all nodes within the cluster.

In connection with instantiating the development environment from the image or template, workspace service 110 may receive one or more other configurations or dependencies that are defined by the user via client system 140, and configuring the development environment with such configurations and dependencies. Workspace execution layer 112 instantiates the development environment based on the image and other configurations or dependencies. In addition, workspace execution layer 112 (e.g., the head node of the cluster) stores the configurations or other dependencies to the NFS. Storing the configurations or dependencies on the NFS enables system 100 to persist such information over termination of the development environment and subsequent starts of the development environment. In addition, workspace execution layer 112 (e.g., the cluster or head node of the cluster) uses the configurations or dependencies persisted on the NFS in connection with spinning up additional worker nodes during scaling.

The user develops code based on inputs to a user interface configured by workspace service 110 (e.g., business application layer 116) and provided to client system 140. The user may manipulate the code being developed within the development environment, or cause the code to be executed such as to test the code. In some embodiments, client system 140 has a development application locally installed, and the development application syncs with the development environment running on workspace service 110.

Workspace execution layer 112 (e.g., the head node) monitors the activity or workload for the development environment. Workspace execution layer 112 intelligently scales the resources of cluster 118 (e.g., starting up or terminating worker nodes accordingly) based on the workload for the development environment. For example, workspace execution layer 112 may determine to change a scale of the cluster based on an expected time to complete an operation(s)/execution (e.g., whether the expected time is greater than or less than one or more time thresholds, such as a scaling up time threshold or a scaling down time threshold), a size of the workload, etc. In response to determining to scale down the resources of cluster 118, workspace execution layer 112 terminates a set of worker nodes. The information processed by the worker nodes is persisted on the NFS across nodes and starts of the development environment. Conversely, in response to determining to scale up the resources of cluster 118, workspace execution layer 112 configures a set of worker nodes based at least in part on the configurations and dependencies stored on the NFS, thereby enabling quick instantiations of worker nodes and eliminating or reducing the burden on the user for provisioning worker nodes.

In some embodiments, workspace service 110 monitors the activity of the development environment and determines whether to terminate the development environment. As an example, workspace service 110 determines to terminate the development environment in response to receiving from the user a request to terminate or exit the development environment. As another example, workspace service 110 determines to terminate the development environment in response to determining that no activity (e.g., no user input) has been input within a predefined threshold period of time. In some embodiments, workspace service 110 determines whether a terminating criterion has been met and in response to determining that a terminating criterion has been met, terminates the development environment. In various embodiments, a terminating criterion includes one of the following: no activity detected in a period of time, no other jobs running on the cluster, a specific date, a specific time, or any other appropriate termination criterion. If workspace service 110 is processing a workload and no user activity has occurred within the predefined threshold period of time, workspace service 110 may continue to process the workload and not terminate the development environment.

In response to determining to terminate the development environment, workspace service 110 (e.g., workspace execution layer 112) performs a snapshot of the development environment. For example, the snapshot may be stored on the NFS mounted to the cluster running the development environment.

In some embodiments, workspace service 110 (e.g., workspace execution layer 112) periodically snapshots the development environment. Workspace service 110 may take or perform snapshots at predetermined intervals. As an example, the predetermined interval is every 5 minutes. However, various other time intervals may be implemented. Workspace service 110 may also take a snapshot in response to an event, such as completion of processing a workload or a particular user input. Snapshots may be implemented by zipping the code directory (e.g., the local NFS directory), including the git folder.

System 100 comprises administrator system 130 for use by an administrator (e.g., an administrator for the system and its services—for example, a control layer or control plane or control system that is capable of spinning up and down resources for cluster 118 and for managing access to the system, such as by using login credentials). For example, administrator system 130 comprises a system for communication, data access, computation, etc. An administrator uses administrator system 130 to maintain and/or configure workspace service 110 and/or resources for cluster 118 and/or one or more data stores (e.g., data store 120). For example, an administrator uses administrator system 130 to (i) start and/or stop services on workspace service 110 and/or data store 120, (ii) reboot data store 120 to install software on workspace service 110 and/or data store 120, and/or (iii) add, modify, and/or remove data on data store 120, and/or to start or add or stop or remove machines for the cluster, etc. Administrator system 130 communicates with workspace service 110 and/or data store 120 via a web-interface. For example, administrator system 130 communicates with workspace service 110 and/or data store 120 via a web-browser installed on administrator system 130. As an example, administrator system 130 communicates with workspace service 110 and/or data store 120 via an application running on administrator system 130.

In various embodiments, an administrator (or other user associated with a tenant or entity with which the tenant is associated such as a customer) uses administrator system 130 to configure a service provided to a tenant. The administrator may use administrator system 130 to configure one or more policies, a predefined image or template of a development environment (e.g., to define an image/template to be available to users associated with the particular customer/tenant), etc. As an example, the administrator uses administrator system 130 to communicate with workspace service 110 to configure the service provided to the tenant or user. For example, administrator system 130 may communicate with workspace service 110 via business application layer 116. In some embodiments, business application layer 116 serves as a gateway via which the administrator may interface to manage, configure, etc. workspace execution layer 112, workspace management layer 114, and/or business application layer 116. Administrator system 130 may configure one or more policies for workspace service 110, such as one or more security policies and/or one or more compute resource policies (e.g., a resource allocation policy), etc.

Data store 120 stores one or more datasets. In some embodiments, data store 120 comprises the NFS storage mounted to a particular cluster running on workspace execution layer 112. In various embodiments, the one or more datasets comprise container data, code development data, development environment data, or any other appropriate data. The container data may include files for one or more containers (e.g., containers that are started up to provide the cluster via workspace service 110).

In some embodiments, data store 120 stores one or more datasets for a plurality of tenants. For example, data store 120 hosts at least part of a software as a service (e.g., a database storing data for the service) for a plurality of tenants such as customers for a provider of the software as a service. Data store 120 may store container data for each of the tenants for which workspace service 110 provides access to customers' users. A tenant may comprise an organization such as a company, a government entity, a sub-organization of an organization (e.g., a department), or any other appropriate organization.

According to various embodiments, a user uses system 100 (e.g., a client system or terminal, such as client system 140, that connects to workspace service 110 via network 150) to define code and to execute the code, such as to process a workload based on data stored on data store 120. For example, a user inputs to client system 140 a request for an application environment, such as a code development environment. In response to receiving the request for the application environment, client system 140 sends the request to workspace service 110 and/or administrator system 130. The request may include an identifier for the container associated with the development environment being requested. Alternatively, or additionally, the request includes a user identifier or account identifier that workspace service 110 and/or administrator system 130 uses to determine the development environment associated with the user, such as a last development environment used by the user. In some embodiments, the access request comprises a user identifier for a user requesting access to the development environment. In some embodiments, the access request comprises a workspace identifier and the user has access to one or more workspaces (e.g., as controlled by the control plane). In some embodiments, access to user storage is based at least in part on a user identity or user identifier. In some embodiments, permissions, as handled by the control plane, are based at least in part on a user identity or user identifier.

In some embodiments, workspace execution layer 112, workspace management layer 114, and/or business application layer 116 are implemented on a single server or a plurality of servers. For example, workspace execution layer 112 and business application layer 116 are different modules running on the same server or set of servers.

Figure 2:
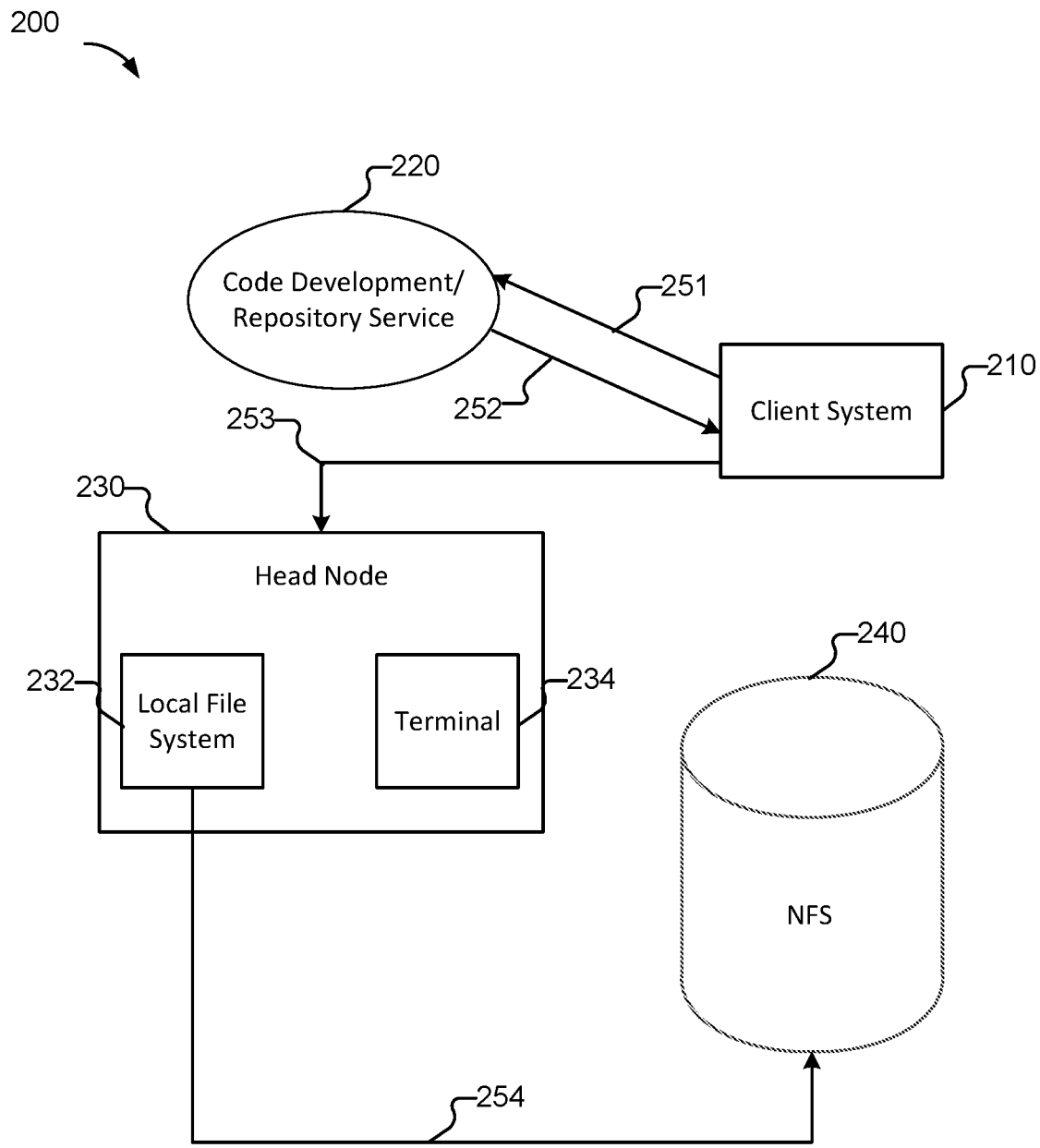
FIG. 2 is a block diagram of an embodiment of a system for developing code.

FIG. 2 is a block diagram of an embodiment of a system for developing code. In the example shown, a process for laptop-centric code development and testing is illustrated.

As illustrated in FIG. 2, system 200 comprises client system 210, code development/repository service 220, cluster 230, and data store 240. In system 200, the user inputs code to client system 210, and when ready to test the code, the user either runs the code locally on client system 210, or provisions cluster 230 to execute the code.

At 251, client system 210 sends to code development/repository service 220 a request for git files associated with a particular project. Code development/repository service 220 may be a third-party service, such as github.com. At 252, code development/repository service 220 sends the git files to client system 210. Accordingly, client system 210 has a git clone locally stored at client system 210 (e.g., the user's laptop). The user uses client system 210 to locally develop code using the git clone. In response to determining to test the code, the user may run the test locally on client system 210. However, if the workload is sufficiently large that executing the code locally on client system 210 is inefficient or not possible, the user determines to start a cluster and offload the execution of the code to the cluster. At 253, the user instantiates cluster 230 and sends to cluster 230 the workload to be tested. In connection with offloading the workload to the cluster, the user typically has to manually provision the cluster and control the scaling of cluster 230, including manually configuring the dependencies and/or configurations for each node spun up on cluster 230 (e.g., terminal 234). Additionally, because clusters typically run on Linux operating systems and client systems typically run on Apple or Microsoft operating systems, code that is developed locally at client system 210 and run locally generally has errors when run at cluster 230. Accordingly, the user is generally required to modify/translate the code provided to cluster 230 to ensure that the code runs on cluster 230. In response to receiving the instruction and provisioning from the user, cluster 230 executes the code. Executing the code may include using one or more worker nodes, such as terminal 234. Data generated during execution of the environment or otherwise pertaining to the cluster is stored at local file system 232. At 254, cluster 230 sends a snapshot of cluster 230 to data store 240.

Figure 3:
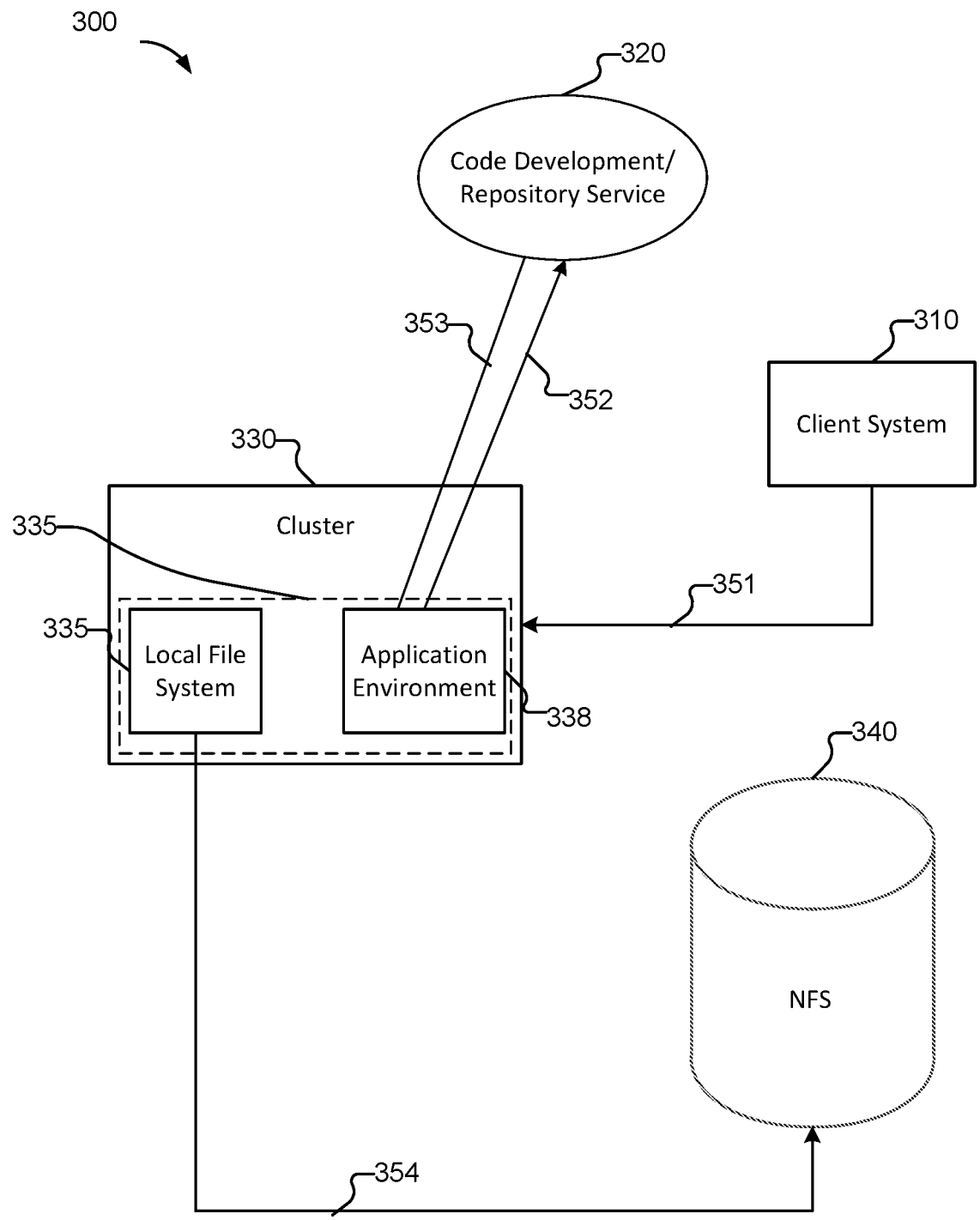
FIG. 3 is a block diagram of a system for providing a development environment according to various embodiments of the present application.

FIG. 3 is a block diagram of a system for providing a development environment according to various embodiments of the present application. In some embodiments, system 300 is implemented by system 100 of FIG. 1. In some embodiments, system 300 implements process 500 of FIG. 5, process 600 of FIG. 6, process 700 of FIG. 7, process 800 of FIG. 8, process 900 of FIG. 9, process 1000 of FIG. 10, and/or process 1100 of FIG. 11. In the example shown, a process for cloud-centric or cluster-centric development and testing of code is illustrated.

As illustrated in FIG. 3, system 300 comprises client system 310, code development/repository service 320, cluster 330, and data store 340. In system 300, a user logs in to system 300, which starts cluster 330 to provide client system 310 with a development environment (e.g., application environment 338). System 300 may instantiate cluster 330 based on a predefined image/template of a development environment, or a snapshot of a development environment used by the user in a previous session. After the initial setting of the configurations or dependencies for cluster 330 (e.g., the head node), including a mounting of data store 340 (e.g., an NFS storage) to cluster 330 as a local file system, cluster 330 stores the configurations and dependencies to the NFS storage, which is persisted across terminations and subsequent starts of cluster 330. The user uses client system 310 to develop code directly on application environment 338. Alternatively, client system 310 may be configured with a local application (e.g., a companion application for the development environment), which allows the user to develop code directly in the local application and the local application syncs the code with the development environment. The code developed in the development environment (or in the local application synced with the development environment) is developed to directly run on cluster 330 without translation, thereby obviating the related art deficiencies in which different operating systems are run on the client systems and the clusters. In connection with developing the code at application environment 338, cluster 330 may be configured to automatically scale based on a workload for testing of the code developed within application environment 338. To scale up additional worker nodes for application environment 338, cluster 330 fetches the corresponding configurations or dependencies from the NFS storage mounted as the working directory of cluster 330 and starts up the additional worker nodes. At 351, the user uses client system 310 to request a session for the application environment (e.g., the user logs into a web service that provides an environment in which the user develops code). At 352, application environment 338 sends a request to code development/repository service 320 for the git files associated with a project (e.g., the project to be developed by the user via the development environment). At 353, application environment 338 receives/downloads the git clone. For example, the git clone is stored in a head node of cluster 330. At 354, data stored in local file system 335 is snapshotted and stored in data store 340.

Figure 4:
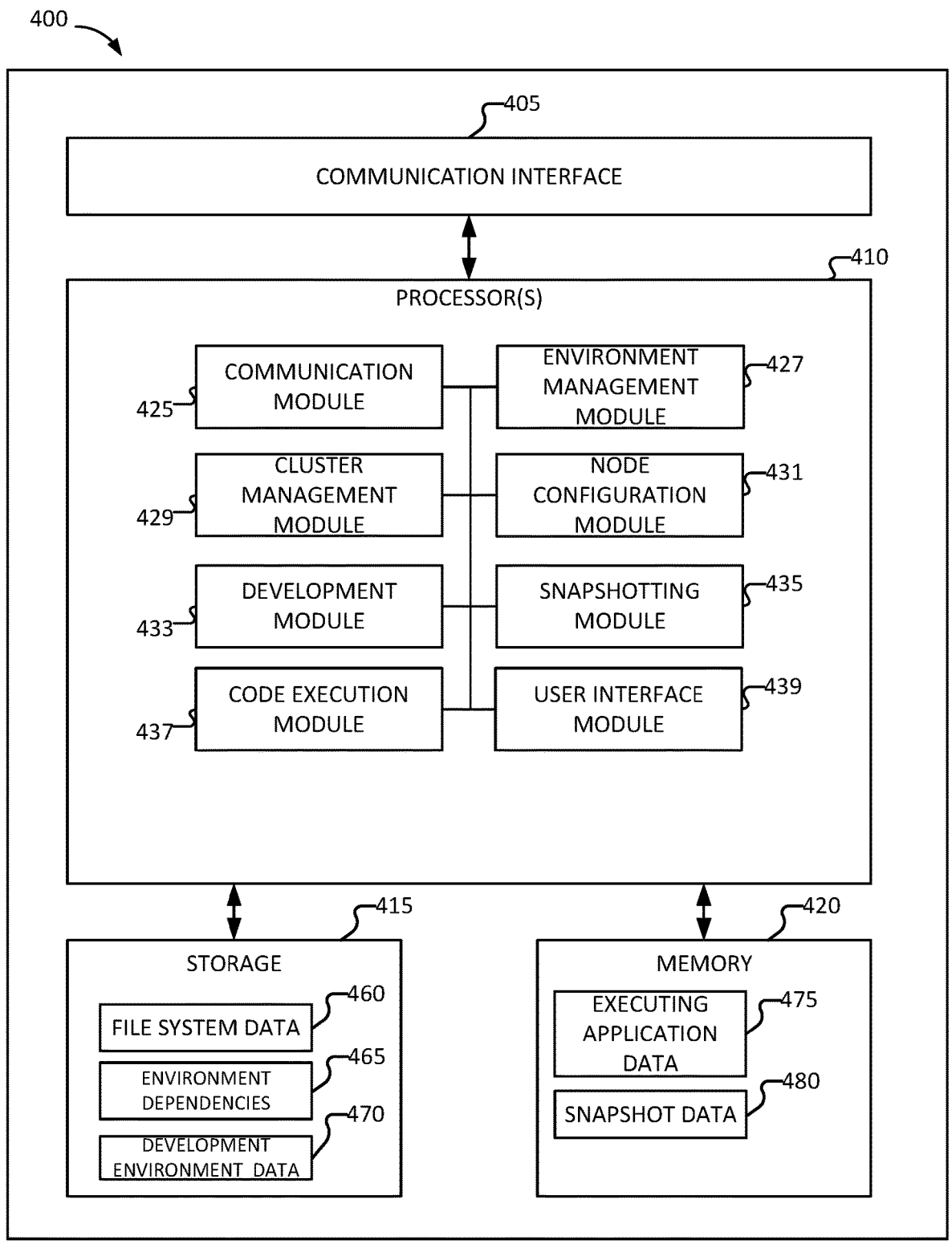
FIG. 4 is a block diagram of a system for providing a development environment according to various embodiments of the present application.

FIG. 4 is a block diagram of a system for providing a development environment according to various embodiments of the present application. In some embodiments, system 400 implements at least part of system 100 of FIG. 1 and/or system 300 of FIG. 3. In some embodiments, system 400 implements process 500 of FIG. 5, process 600 of FIG. 6, process 700 of FIG. 7, process 800 of FIG. 8, process 900 of FIG. 9, process 1000 of FIG. 10, and/or process 1100 of FIG. 11.

In the example shown, system 400 implements one or more modules in connection with starting containers and/or providing the container to a user, such as to provide a corresponding application as a service. System 400 comprises communication interface 405, one or more processors 410, storage 415, and/or memory 420. One or more processors 410 comprises one or more of communication module 425, environment management module 427, cluster management module 429, node configuration module 431, development module 433, snapshotting module 435, code execution module 437, and/or user interface module 439.

In some embodiments, system 400 comprises communication module 425. System 400 uses communication module 425 to communicate with various client terminals or user systems such as a user system (e.g., client system 140) or an administrator system (e.g., administrator system 130), various other services, or data store 120, etc. For example, communication module 425 provides to communication interface 405 information that is to be communicated to the other systems or services. As another example, communication interface 405 provides communication module 425 information received by system 400. Communication module 425 is configured to receive user inputs, such as code being developed by the user in the development environment. Communication module 425 may be further configured to receive one or more queries or requests to execute code (e.g., requests for processing workloads, servicing queries, etc.) such as from various client systems (e.g., via a business application layer), and/or requests for a development environment, etc. The one or more queries or requests to execute tasks are with respect to information stored in one or more datasets (e.g., data stored in data store 120), such as a directory for an NFS mounted to a cluster running/providing the development environment. Communication module 425 is configured to provide various client terminals or user systems information such as information that is responsive to the one or more queries or tasks requested to be executed. For example, communication module 425 is configured to provide access to a container, such as a user interface for an application environment running on the container.

In some embodiments, system 400 comprises environment management module 427. System 400 uses environment management module 427 to manage development environments. Environment management module 427 may store predefined cluster images or templates for a development environment (or images/templates of the container/cluster used to deploy the particular development environment) and/or other predefined configurations or dependencies for a development environment that are to be made available to a user requesting a development environment.

In response to receiving a request for a development environment, environment management module 427 may determine the development environment or type of development environment to be started based at least in part on the request. For example, the request may comprise an identifier for the development environment to be started, or environment management module 427 may determine the user/account associated with the request and query a mapping of development environments to users/accounts. System 400 may store a mapping of users/accounts to last-used development environments, and environment management module 427 may identify and start the development environment last used by the user/account (e.g., the development environment started in the previous session).

In response to determining the development environment to start, environment management module 427 may invoke cluster management module 429 to start up a cluster to run the development environment and to manage the cluster during runtime of the development environment.

In some embodiments, environment management module 427 determines when to terminate a development environment. Environment management module 427 may determine to terminate the development environment in response to receiving an indication that a user has exited the system or a specific request from the user to exit/terminate the development environment. Additionally, or alternatively, environment management module 427 may determine to terminate the development environment based at least in part on a monitoring of an activity within the development environment (e.g., the cluster management module 429 may report activity within the development environment). For example, environment management module 427 determines to terminate the development environment in response to determining that no activity (e.g., no user input) has been input within a predefined threshold period of time and the development environment is not currently processing (or scheduled to process) a workload.

In some embodiments, system 400 comprises cluster management module 429. System 400 uses cluster management module 429 to start and manage a cluster to run a development environment for a system to provide the development environment to a user (e.g., a client system). In response to a request to start a development environment, cluster management module 429 determines whether the development environment was previously started (e.g., whether the user is returning to use a previously instantiated development environment or whether a new development environment is to be instantiated), such as based on the request to start the development environments or a mapping of development environments to users/accounts (e.g., a mapping for last used development environments for the users, or a mapping of previously started development environments for the users).

If the development environment has not been previously started (e.g., for the user/account), cluster management module 429 obtains a predetermined image or template for the development environment (e.g., from storage 415) and starts the cluster. Cluster management module 429 may further configure or set dependencies for the development environment, such as based on user input, or a policy associated with the user (or a company with which the user is associated). Starting the development environment includes mounting a storage to the development environment (e.g., to the cluster, such as to the head node). The storage may be a network file system (NFS) that allows the cluster (e.g., the head node, and subsequent worker nodes that are spun up) to access files and directories over a network as if the files were located on the local machine. In response to starting the cluster to run the development environment and mounting the storage, cluster management module 429 stores a set of configurations or dependencies for the development environment to the NFS.

If the development environment has been previously started, cluster management module 429 obtains a stored snapshot for the development environment and spins up a cluster based on the snapshot. The snapshot may be stored in the NFS.

In some embodiments, cluster management module 429 is configured to scale the cluster based on required resources (e.g., based on the workload). For example, cluster management module 429 automatically and dynamically scales the cluster based at least in part on the workload and/or a cluster management policy (e.g., a quality-of-service policy for the user or customer with which the user is associated). In the case of scaling up the cluster (e.g., spinning up one or more additional worker nodes), cluster management module 429 spins up the node and uses node configuration module 431 to configure the newly spun up worker node(s). For example, the new worker node(s) may be configured based on the set of configurations or dependencies stored in the NFS. Accordingly, the set of configurations or dependencies may be quickly retrieved, and the additional worker node(s) may be provisioned without manual intervention. The worker nodes are provisioned with the same dependencies as the head node of the cluster in a manner that does not require the user to configure/provision the worker node(s).

Cluster management module 429 may terminate the cluster in response to receiving an indication from environment management module 427 that the development environment is to be terminated.

In some embodiments, system 400 comprises node configuration module 431. System 400 uses node configuration module 431 to obtain the set of configurations or dependencies for a development environment from the NFS mounted to the cluster. The set of configurations or dependencies stored on the NFS are persisted through termination and subsequent starts of the development environment.

In some embodiments, system 400 comprises development module 433. System 400 uses development module 433 to provide a user interface (e.g., a user interface configured by user interface module 439) to a user and enable the user to develop code in the development environment. In some embodiments, development module 433 is configured to connect to a development application running on the user's client system to sync changes to the code in order to maintain the current code on the development environment running on the cluster.

In some embodiments, system 400 comprises snapshotting module 435. System 400 uses snapshotting module 435 to snapshot the development environment and store the snapshot on the NFS or other persistent storage that persists the snapshot for subsequent starts of the development environment. Snapshotting module 435 may snapshot the development environments according to a predetermined interval (e.g., every 5 minutes, etc.) or in response to a determination that the current session is to be terminated (e.g., a determination that the cluster running the development environment is to be terminated).

In some embodiments, system 400 comprises code execution module 437. System 400 uses code execution module 437 to execute code being developed in the development environment. For example, the user causes the cluster to execute the code in order to test the code during development. Code execution module 437 may determine the workload to be processed in connection with executing the code, and may provide such information to cluster management module 429 for allocation across various worker nodes in the cluster.

In some embodiments, system 400 comprises user interface module 439. System 400 uses user interface module 439 in connection with configuring information (or the display thereof) to be provided to the user such as via administrator system 130 and/or client system 140 of system 100. For example, user interface module 439 configures and provides a user interface via which a user accesses the development environment running on the cluster. In some embodiments, user interface module 439 configures a user interface to be displayed at a client system, such as an interface that is provided in a web browser at the client system. User interface module 439 may configure a user interface via which a user may develop code.

According to various embodiments, storage 415 comprises one or more of file system data 460, environment dependencies 465, and development environment data 470. Storage 415 may comprise a shared storage system (e.g., a network storage system). In some embodiments, file system data 460 comprises a database such as one or more datasets (e.g., one or more datasets for one or more tenants, etc.). File system data 460 may store predefined images or templates for clusters or development environments to be run on a cluster.

In some embodiments, environment dependencies 465 may store predefined configurations or dependencies of an instantiated development environment. For example, system 400 stores the set of dependencies for a particular development environment in the NFS storage mounted to the cluster.

In some embodiments, development environment data 470 comprises information pertaining to the development environment. For example, development environment data 470 comprises the git files for the development environment (e.g., for the project associated with the development environment). Development environment data 470 may be stored on the NFS storage mounted to the cluster (e.g., storage that is mounted as a working directory and that is persisted through termination and subsequent starts of the cluster/development environment).

According to various embodiments, memory 420 comprises executing application data 475 and snapshot data 480.

Executing application data 475 comprises data obtained or used in connection with executing an application such as an application executing on the development environment. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Snapshot data 480 comprises snapshots of the development environment that are captured by snapshotting module 435. Snapshot data 480 may be copied to the NFS mounted to the cluster.

Figure 5:
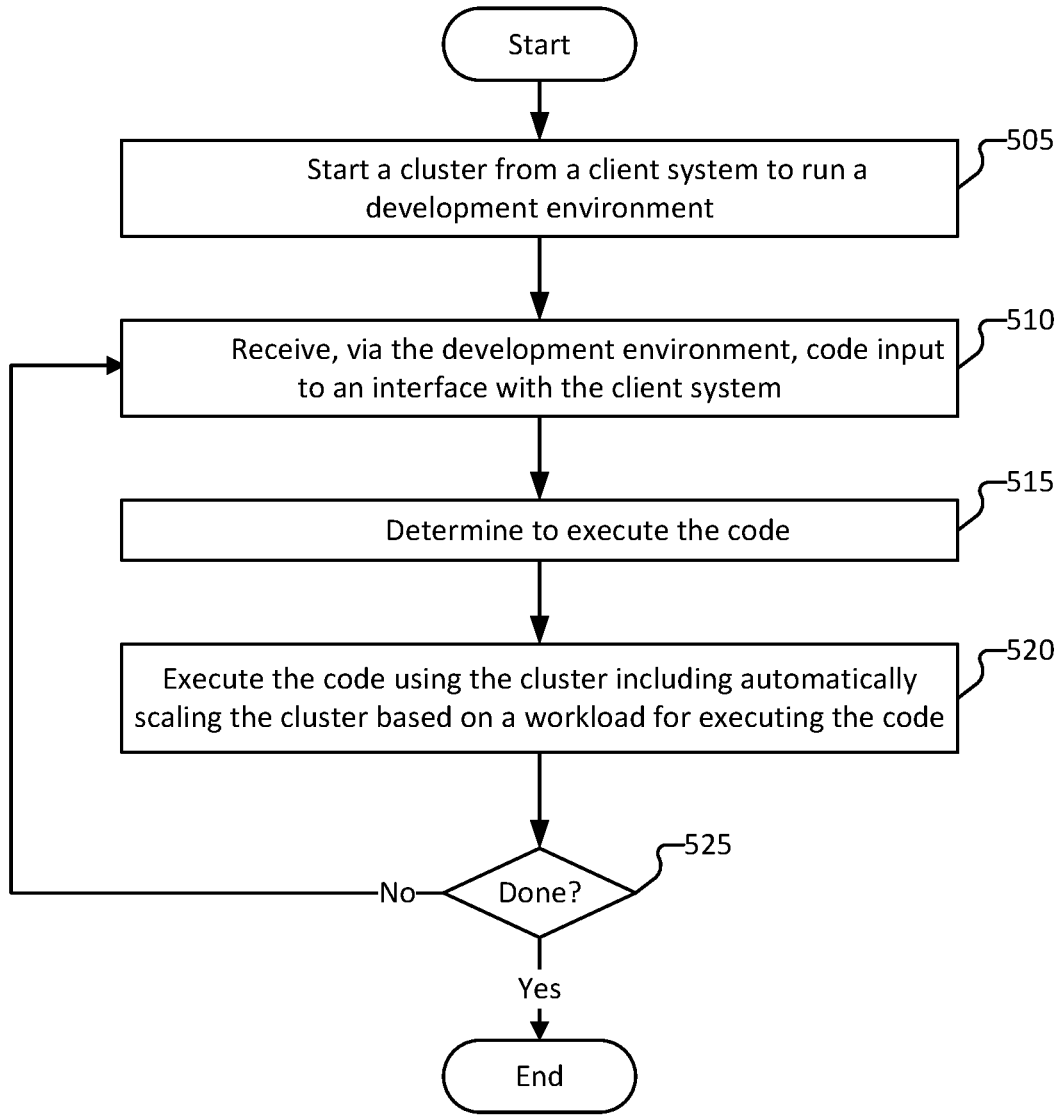
FIG. 5 is a flow diagram of a method for providing a development environment according to various embodiments of the present application.

FIG. 5 is a flow diagram of a method for providing a development environment according to various embodiments of the present application. In some embodiments, process 500 is implemented at least in part by system 100 of FIG. 1, system 300 of FIG. 3, and/or system 400 of FIG. 4.

At 505, a cluster to run a development environment is started from a client system. As an example, a user uses a client system to log into a cloud service to request a development environment. The cloud service determines the development environment to be started, and instantiates a cluster to run the development environment and provide the development environment as a service to the client system.

At 510, the system receives, via the development environment, code input to an interface with the client system. The code may be input directly to the development environment or to a local application running on the client system, which is then synced with the development environment running on the cluster.

At 515, the system determines to execute the code. As an example, the system determines to execute the code based on a request from the user. For example, the user requests to execute the code in connection with testing the code being developed at the development environment.

At 520, the system executes the code using the cluster, including automatically scaling the cluster based on a workload for executing the code. The system provisions additional worker nodes based on the workload associated with executing the code, and terminates the worker nodes when the workload has decreased. Provisioning additional worker nodes includes fetching predefined configurations/dependencies for the node from a working directory corresponding to an NFS storage mounted to the cluster, and configuring the worker node(s) using the configurations/dependencies.

In some embodiments, automatically scaling the cluster includes configuring each worker node of the cluster to use data stored on the network file storage that is persisted through subsequent starts of the development environment.

In some embodiments, automatically scaling the cluster includes instantiating a new worker node for the cluster, comprising (a) retrieving the set of dependencies from the network file storage, and (b) configuring the new worker node based at least in part on the set of dependencies. As an example, the configuring the set of dependencies includes copying the set of dependencies to the network file storage that is persisted through subsequent starts of the development environment. As another example, automatically scaling the cluster includes configuring each worker node of the cluster based on the set of dependencies stored to the network file storage that is persisted through subsequent starts of the development environment.

At 525, a determination is made as to whether process 500 is complete. In some embodiments, process 500 is determined to be complete in response to a determination that no activity has been monitored within the development environment within a predefined time threshold, the development environment has been terminated, the user has exited the system (e.g., the user exits the development environment that is provided by the cluster), an administrator indicates that process 500 is to be paused or stopped, etc. In response to a determination that process 500 is complete, process 500 ends. In response to a determination that process 500 is not complete, process 500 returns to 510. In some embodiments, 525 is a determination of whether to terminate the development environment, and in response to determining to terminate, the development environment is terminated and the process ends, and in response to determining not to terminate, control passes to 510.

Figure 6:
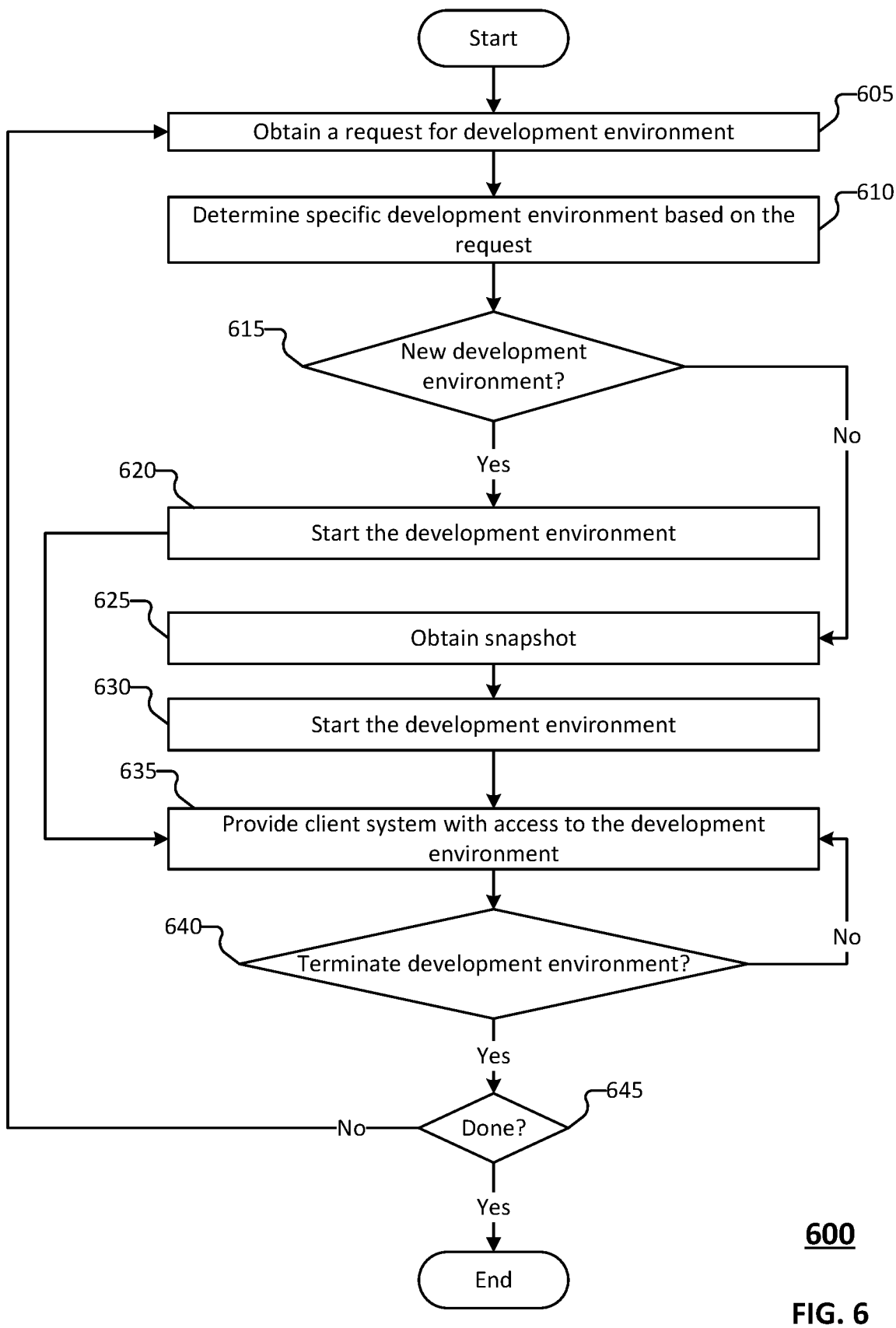
FIG. 6 is a flow diagram of a method for providing a development environment according to various embodiments of the present application.

FIG. 6 is a flow diagram of a method for providing a development environment according to various embodiments of the present application. In some embodiments, process 600 is implemented at least in part by system 100 of FIG. 1, system 300 of FIG. 3, and/or system 400 of FIG. 4.

At 605, a request for a development environment is obtained. The request may be received from a user (e.g., a user on a client system that is connected to the system providing a development environment as a service, such as system 100 or system 400).

At 610, a specific development environment to be started is determined based at least in part on the request. The system determines the development environment or a type of development environment to be started. The development environment may be determined based on the request, such as based on a development environment identifier comprised in the request, or a user/account identifier comprised in the request which is used to query a mapping of development environments to user/account identifiers (e.g., to determine the development environment last used by the user in a previous session).

At 615, the system determines whether the specific development environment is a new development environment. For example, the system determines whether the development environment has been previously started (e.g., previously started for the user or account associated with the request). In response to determining that the development environment is a new development environment (e.g., has not been previously started for the user or account associated with the request) at 615, process 600 proceeds to 620. Conversely, in response to determining that the development environment is not a new development environment (e.g., has been previously started for the user or account associated with the request), process 600 proceeds to 625.

In some embodiments, in response to receiving a request for a development environment (e.g., a request to access the development environment), if the development environment is a new development environment, the system causes a cluster associated with the development environment corresponding to the access request to start based at least in part on a corresponding cluster image. In some embodiments, starting the cluster includes instantiating the cluster based on a predefined cluster image and configuring a set of dependencies for the cluster. In some embodiments, starting the cluster comprises instantiating a cluster and then loading an image or one or more separate software packages (e.g., an operating system, a code editor, repository interface, storage system interface, etc.). In some embodiments, the predefined cluster image comprises a server image with an operating system and a code editor (e.g., linux and vscode).

At 620, the development environment is started. In some embodiments, the system invokes process 800 of FIG. 8 to start the development environment. Thereafter, process 600 proceeds to 635. If the development environment is newly started (e.g., instantiated for the user for a new development project), the system downloads an image/template of the development environment, instantiates the header node for a cluster based on the image/template, and provides the development environment running on the cluster to the client system. When a user first creates a workspace (e.g., requests a service to provide a development environment via a cluster), the system generates a unique SSH key and associates the SSH key with the user account. The SSH key is available in a working directory in the cluster. The user can configure system 400 to connect to a third-party service, and the user correspondingly configures the third party service to authorize/enable access to third-party services, such as GitHub or other services. In response to such a configuration, the cluster may use the SSH key to access information at the third-party service, such as a code repository.

If the development environment has been previously started for the user (e.g., the user used the development environment in a previous session), the system fetches a snapshot of the development environment from persistent storage mounted to the cluster (e.g., an NFS storage mounted as a working directory for the cluster). As an example, the code is persisted on the network file storage through at least one subsequent start of the development environment.

At 625, a snapshot of the development environment is obtained. The system may invoke process 900 in connection with obtaining the snapshot. In some embodiments, the snapshot is obtained from the working directory or NFS mounted to the cluster.

At 630, the development environment is started. The system uses the snapshot in connection with instantiating the cluster (e.g., the head node) that runs the development environment.

At 635, the client system is provided with access to the development environment. In some embodiments, the system invokes process 1000 of FIG. 10.

At 640, the system determines whether to terminate the development environment. In response to determining that the development environment is not to be terminated at 640, process 600 returns to 635 at which the system continues to provide the client with the development environment until the system determines to terminate the development environment (e.g., process 600 iterates over 635-640 until the development environment is determined to be terminated). Conversely, in response to determining that the development environment is to be terminated at 640, the system terminates the development environment and proceeds to 645. The system may invoke process 1100 in connection with terminating the development environment.

At 645, a determination is made as to whether process 600 is complete. In some embodiments, process 600 is determined to be complete in response to a determination that the development environment has been successfully started, no activity has been monitored within the development environment within a predefined time threshold, the development environment has been terminated, the user has exited the system (e.g., the user exits the development environment that is provided by the cluster), an administrator indicates that process 600 is to be paused or stopped, etc. In response to a determination that process 600 is complete, process 600 ends. In response to a determination that process 600 is not complete, process 600 returns to 605.

Figure 7:
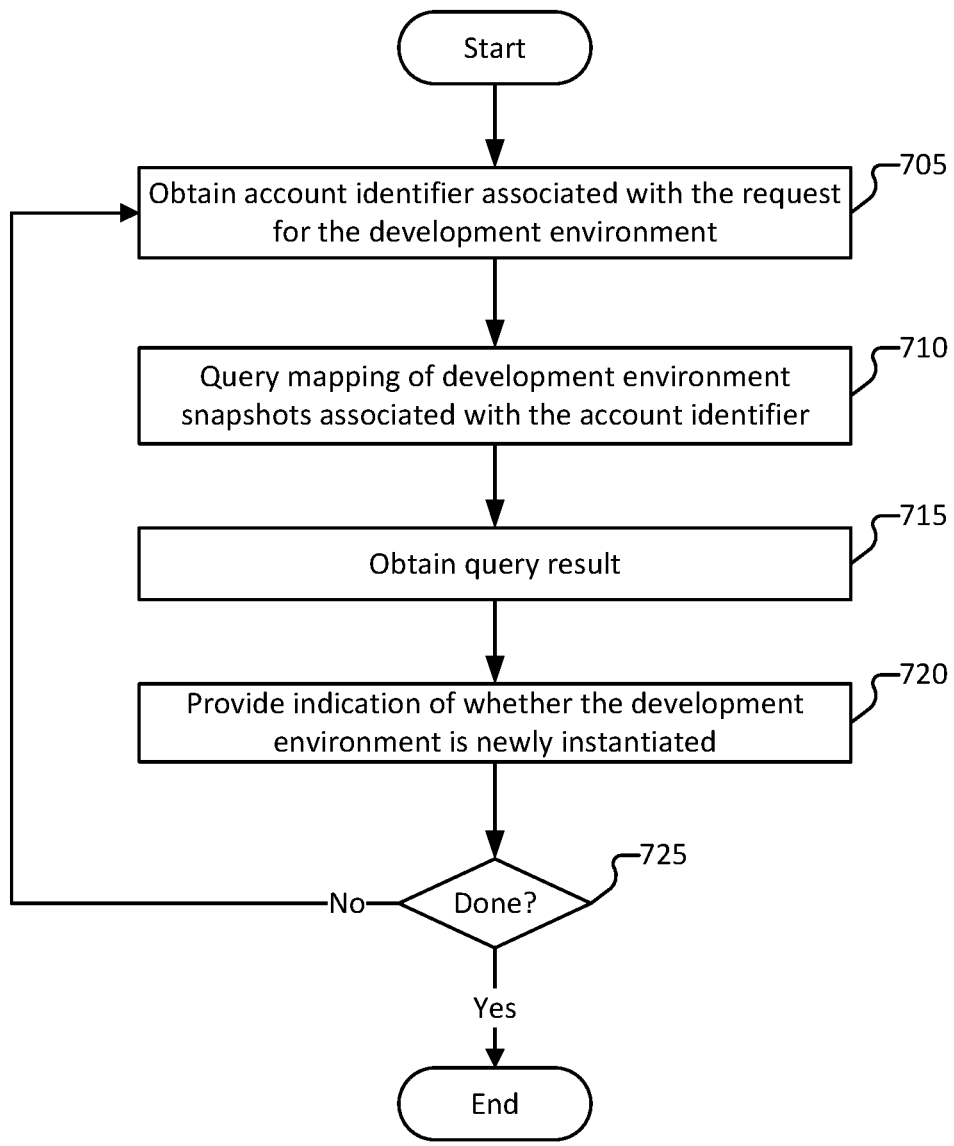
FIG. 7 is a flow diagram of a method for determining whether the development environment has been previously instantiated according to various embodiments of the present application.

FIG. 7 is a flow diagram of a method for determining whether the development environment has been previously instantiated according to various embodiments of the present application. In some embodiments, process 700 is implemented at least in part by system 100 of FIG. 1, system 300 of FIG. 3, and/or system 400 of FIG. 4.

At 705, the system obtains an account identifier associated with the request for the development environment. The account identifier may be a user identifier for a particular user of the customer. At 710, the system queries the mapping of development environment snapshots associated with the account identifier. As an example, the mapping includes a mapping of development environment snapshots to users or accounts. As another example, the mapping includes a mapping of users to snapshots for the development environment last used by the users. At 715, the system obtains a query result. At 720, the system provides an indication of whether the development environment is newly instantiated. At 725, a determination is made as to whether process 700 is complete. In some embodiments, process 700 is determined to be complete in response to a determination that the development environment has been successfully started, no further development environments are to be started, the user has exited the system (e.g., the user exits the development environment that is provided by the cluster), an administrator indicates that process 700 is to be paused or stopped, etc. In response to a determination that process 700 is complete, process 700 ends. In response to a determination that process 700 is not complete, process 700 returns to 705.

Figure 8:
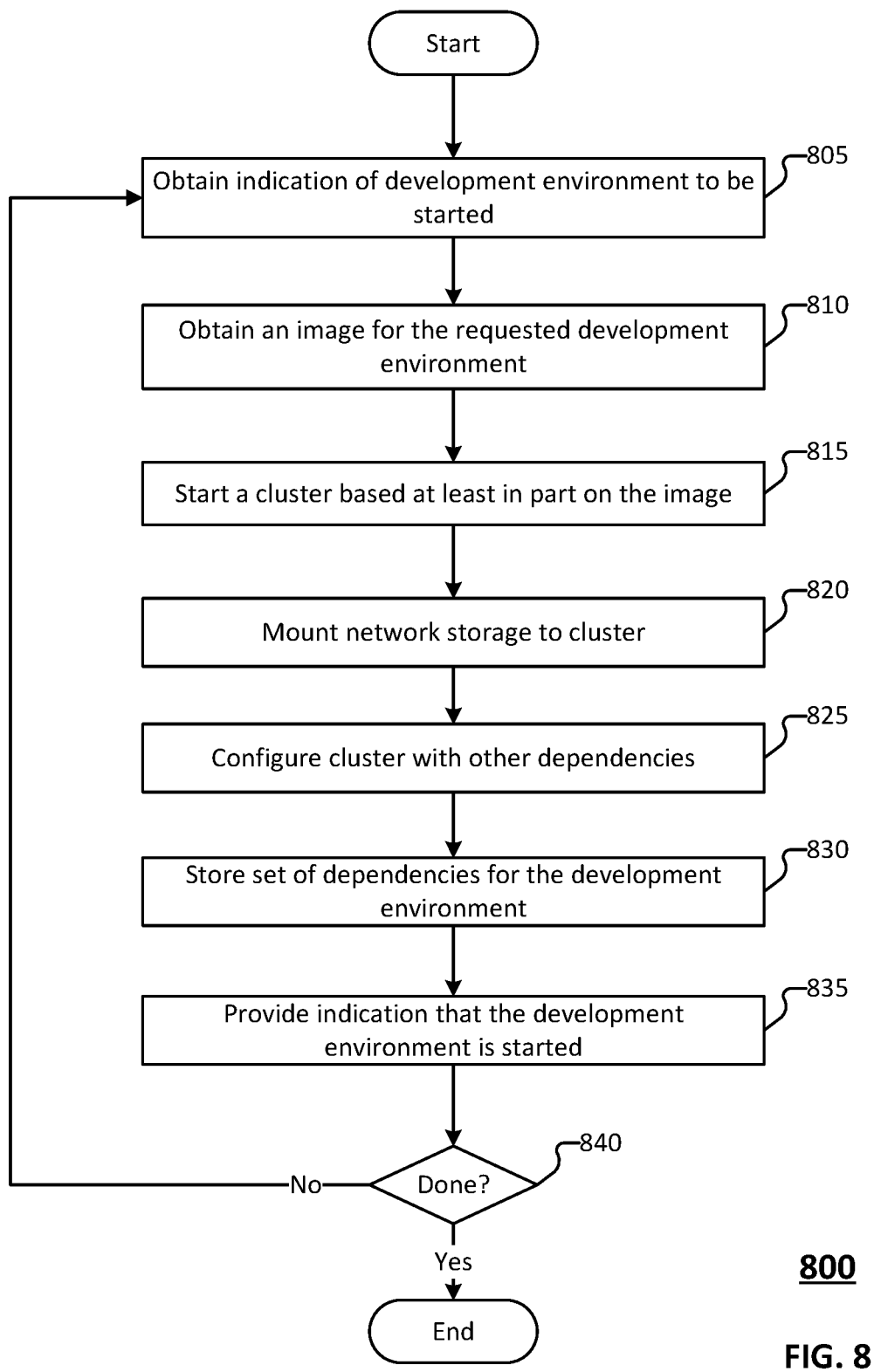
FIG. 8 is a flow diagram of a method for starting a development environment according to various embodiments of the present application.

FIG. 8 is a flow diagram of a method for starting a development environment according to various embodiments of the present application. In some embodiments, process 800 is implemented at least in part by system 100 of FIG. 1, system 300 of FIG. 3, and/or system 400 of FIG. 4. Process 800 may be invoked by another process or service, such as at 620 of process 600 of FIG. 6.

At 805, an indication of the development environment to be started is obtained. The indication may be received from a user, such as a user logging into a cloud service that provides development environments as a service (e.g., development environments running on a cluster). The indication may include an identifier for a requested development environment or requested type of development environment. Alternatively, in response to receiving the request for a development environment, the system may prompt the user to select a particular development environment or type of development agreement from a set of available development environments, etc.

At 810, an image for the requested development environment is obtained. One example is to query a data store storing images or templates for development environments, and download the requested development environment.

At 815, a cluster is started based at least in part on the image. The system configures the cluster based on the image or template for the development environment.

At 820, a network storage is mounted to the cluster. In some embodiments, the system mounts the network storage (e.g., an NFS) to the cluster as a working or local directory. As an example, each node within the cluster may use the NFS as local storage. The network storage is persisted across cluster termination and subsequent starts. For example, the system saves the code files and git state in a data plane account. The system is implemented as a combination of a cluster and directory in a cloud storage where the workspace snapshots are stored.

At 825, the cluster is configured with one or more other dependencies. In some embodiments, the system enables a user to quickly modify/configure the development environment. For example, the user can modify the development environment by installing a package (e.g., a Python Package Index (PyPI) packages). The installed packages are made available on every node of the cluster. For example, the package is persisted on the local storage (e.g., the NFS mounted to the nodes of the cluster), and the head node uses the packages in connection with starting additional worker nodes in the cluster.

When the workspace/development environment has started, the user may obtain the corresponding SSH key and configure third party services to authorize the development environment to access such third-party services (e.g., a GitHub repository, etc.). The git repository state for the third-party service is restored in the working directory of the workspace (e.g., upon restart of the development environment).

In some embodiments, the user may configure the system to enable libraries to be persisted and available across all nodes in the cluster. For example, the user can install the package (e.g., pip install -user) and the package will be put into cluster local storage (e.g., /mnt/cluster_storage/pypi). As another example, the user can store environment variables associated with the user or account in the workspaces/development environments. These environment variables will be available to jobs submitted for execution on the cluster, and to the development environment.

At 830, the set of dependencies for the development environment are stored.

In some embodiments, the system enables the users/worker nodes to share files, for example datasets for machine learning model training, across all worker nodes. For example, the mounting of the NFS as the working directory for the cluster, or nodes of the cluster, enables all worker nodes can access the files stored at such storage. Accordingly, the data can be quickly shared across nodes, used to instantiate new nodes, and/or persist across sessions.

At 835, the system provides an indication that the development environment has started. In some embodiments, the system provides the indication to the service, other system, or process that invoked process 800.

At 840, a determination is made as to whether process 800 is complete. In some embodiments, process 800 is determined to be complete in response to a determination that the development environment has been successfully started, no further development environments are to be started, the user has exited the system (e.g., the user exits the development environment that is provided by the cluster), an administrator indicates that process 800 is to be paused or stopped, etc. In response to a determination that process 800 is complete, process 800 ends. In response to a determination that process 800 is not complete, process 800 returns to 805.

Figure 9:
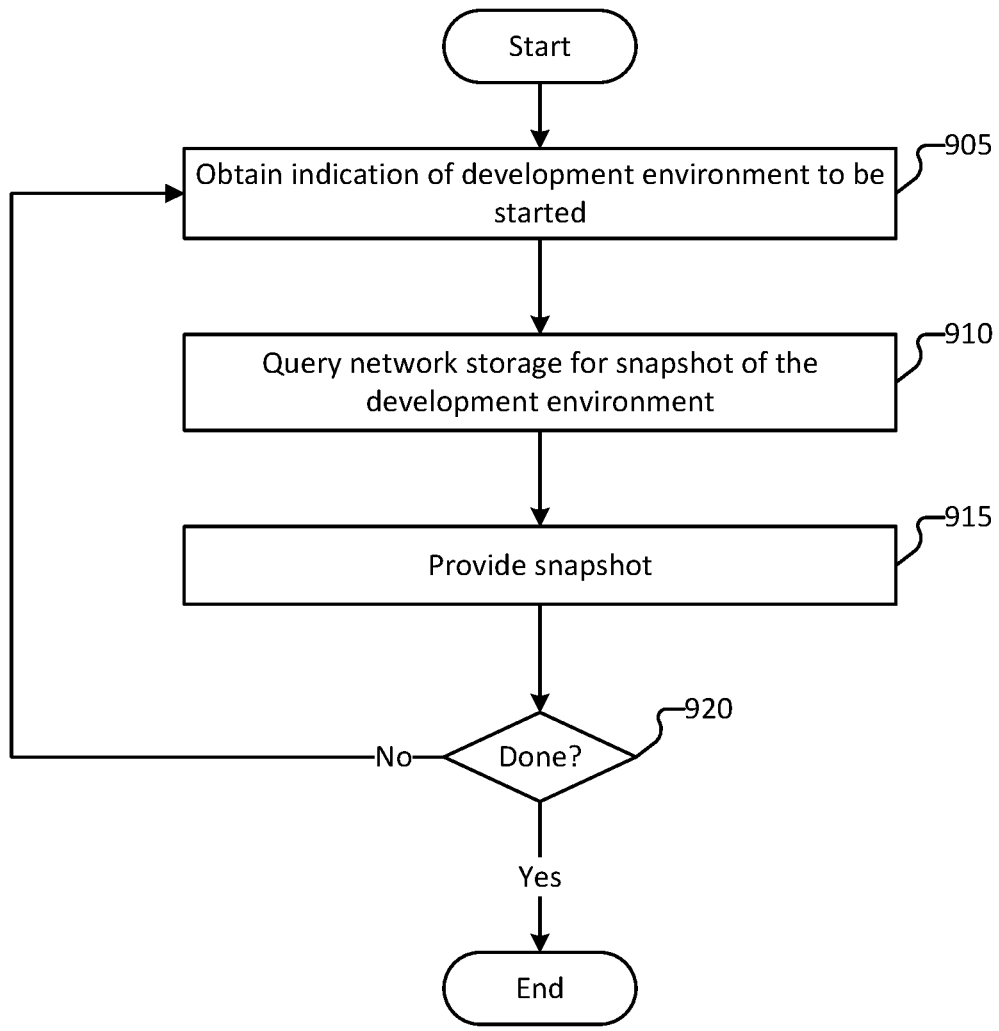
FIG. 9 is a flow diagram of a method for obtaining a copy of a previously started development environment according to various embodiments of the present application.

FIG. 9 is a flow diagram of a method for obtaining a copy of a previously started development environment according to various embodiments of the present application. In some embodiments, process 900 is implemented at least in part by system 100 of FIG. 1, system 300 of FIG. 3, and/or system 400 of FIG. 4. Process 900 may be invoked by another process or service, such as at 625 of process 600 of FIG. 6.

At 905, the system obtains an indication of the development environment to be started. At 910, the system queries the network storage for a snapshot of the development environment. The system may query the network storage based on an identifier obtained in connection with the indication to start the development environment. The identifier may be a user identifier, an account identifier, a development environment identifier (or identifier for a particular development environment snapshot identifier), etc. Various other types of identifiers may be used to obtain the appliable snapshot for the development environment.

At 915, the snapshot is provided.

At 920, a determination is made as to whether process 900 is complete. In some embodiments, process 900 is determined to be complete in response to a determination that the snapshot was provided, the development environment was successfully started, the user has exited the system (e.g., the user exits the development environment that is provided by the cluster), an administrator indicates that process 900 is to be paused or stopped, etc. In response to a determination that process 900 is complete, process 900 ends. In response to a determination that process 900 is not complete, process 900 returns to 905.

Figure 10:
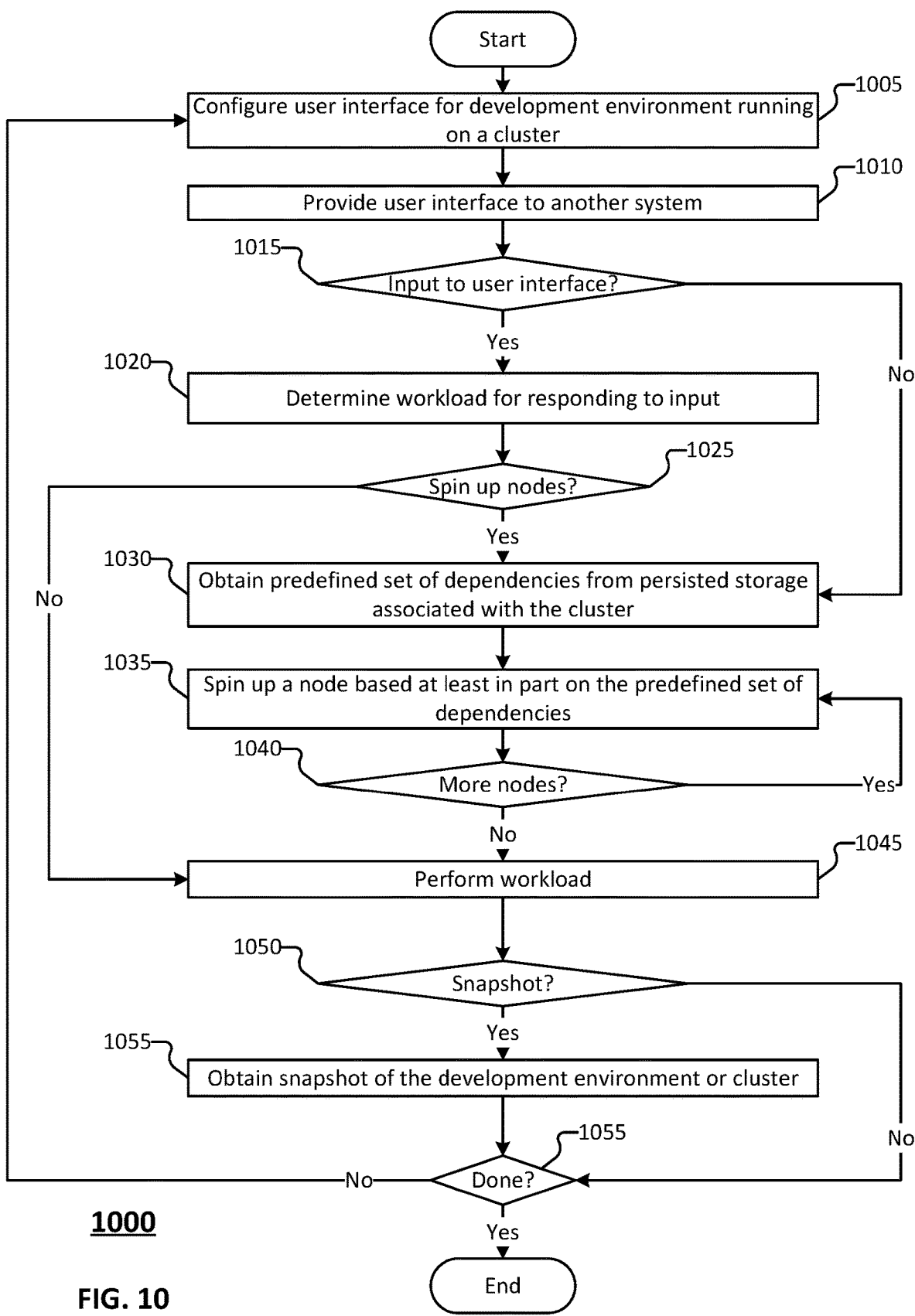
FIG. 10 is a flow diagram of a method for providing a development environment according to various embodiments of the present application.

FIG. 10 is a flow diagram of a method for providing a development environment according to various embodiments of the present application. In some embodiments, process 1000 is implemented at least in part by system 100 of FIG. 1, system 300 of FIG. 3, and/or system 400 of FIG. 4. Process 1000 may be invoked by another process or service, such as at 640 of process 600 of FIG. 6.

At 1005, the system configures a user interface for the development environment running on a cluster. At 1010, the system provides a user interface to another system, such as a client system (e.g., a terminal used by a user to develop code). For example, the user interface provides a workspace interface for the development environment running on the cluster.

At 1015, the system determines whether an input to the user interface is received. For example, the system monitors for activity (e.g., user activity, or processing workloads, etc.) to determine whether the user is actively using the application environment or whether the application environment is processing a workload for the user. The system may determine whether the input to the user interface is received within a predefined threshold period of time (e.g., the previous 5 minutes or another configured time threshold). In response to determining that an input to the user interface is received, process 1000 proceeds to 1020. Conversely, in response to determining that a user input is not received, process 1000 proceeds to 1030.

At 1020, the system determines the workload for responding to the input.

At 1025, the system determines whether to spin up nodes. In some embodiments, the system determines whether to spin up one or more nodes based on the workload of the development environment, such as the workload for responding to the input. For example, the system determines whether the extent/amount of the workload exceeds a first workload amount threshold, whether the expected time to complete the workload exceeds a first workload time threshold, etc. Various other properties of the workload or policy associated with the user (e.g., a policy for the providing a development environment as a service to the user) may be used in connection with determining whether to update a scaling of the cluster. If the workload exceeds the first workload amount threshold or if the time to complete the workload exceeds the first workload time threshold, the system determines to spin up an additional node. In response to determining that no nodes are to be spun up at 1025, process 1000 proceeds to 1045. Conversely, in response to determining that a node(s) is to be spun up at 1025, process 1000 proceeds to 1030.

At 1030, the system obtains a predefined set of dependencies from the persistent storage associated with the cluster (e.g., the NFS mounted to the cluster/node(s)). In some embodiments, when a new workspace on a development environment is created, the user can use a compute configuration to specify the node types and numbers for the underlying cluster. The configurations may also be stored on the persistent storage associated with the cluster, and used in connection with spinning up/configuring additional worker nodes.

At 1035, the system spins up a node based at least in part on the predefined set of dependencies.

At 1040, the system determines whether an additional node(s) is to be spun up. In response to determining that additional node(s) are to be spun up, process 1000 returns to 1035 and process 1000 iterates over 1035-1040 until no further nodes are to be spun up. Conversely, in response to determining that no additional node(s) are to be spun up, process 1000 proceeds to 1045.

At 1045, the system performs the workload. The system may dynamically and automatically scale up the cluster performing the workload, such as based on a size of the workload or an estimated time to complete the workload. For example, process 1000 iterates over 1005 to 1055 until the workload is no longer being performed.

At 1050, the system determines whether to capture a snapshot of the development environment. The system may determine whether to capture the snapshot based on the time since a last snapshot was performed, an indication that the cluster is to be terminated, or in response to a predefined event.

At 1055, the system obtains a snapshot of the development environment or cluster. The system stores the snapshot in the local storage (e.g., the NFS storage persisted through termination and subsequent starts of the cluster/development environment).

At 1055, a determination is made as to whether process 1000 is complete. In some embodiments, process 1000 is determined to be complete in response to a determination that the development environment is to be terminated, the user has exited the system (e.g., the user exits the development environment that is provided by the cluster), an administrator indicates that process 1000 is to be paused or stopped, etc. In response to a determination that process 1000 is complete, process 1000 ends. In response to a determination that process 1000 is not complete, process 1000 returns to 1005.

Figure 11:
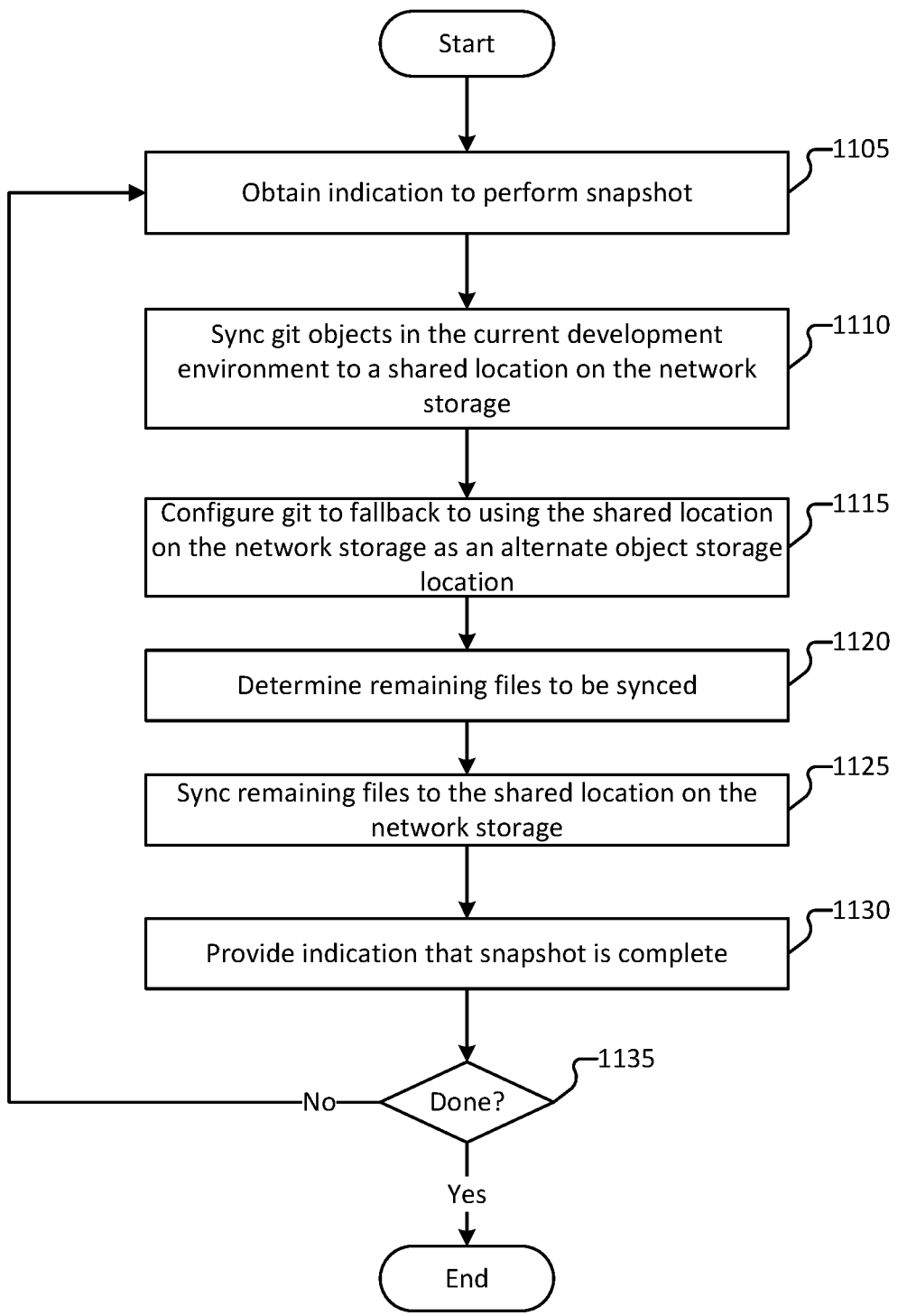
FIG. 11 is a flow diagram of a method for performing a snapshot of a development environment according to various embodiments of the present application.

FIG. 11 is a flow diagram of a method for performing a snapshot of a development environment according to various embodiments of the present application. In some embodiments, process 1100 is implemented at least in part by system 100 of FIG. 1, system 300 of FIG. 3, and/or system 400 of FIG. 4. Process 1100 may be invoked by another process or service, such as at 640 or 645 of process 600 of FIG. 6.

In some embodiments, the system captures snapshots of the development environment in order for the system to be able to re-start the development environment at a subsequent session. The snapshot may be captured at regular intervals (e.g., predetermined intervals) or in response to an event, such as the receiving a request to terminate the development environment. As an example, the system captures a snapshot at intervals based on a threshold period of time. The threshold period of time may be 5 minutes; however, various other intervals may be used. In some embodiments, the snapshot comprises a mounting to the network file storage and does not comprise network dependencies to third party services. The snapshot may be stored in a compressed format.

In some embodiments, the capturing of the snapshot includes zipping up the code directory, including the .git folder. In some embodiments, to optimize the size of the .git folder, the system may sync (e.g., using the rsync command) git objects to a common cloud storage directory (e.g., an Elastic File System (EFS) directory) so that the .git folder in the zip only contains metadata.

At 1105, the system obtains an indication to perform a snapshot. The indication may be obtained based on an elapsing of a threshold period of time since a last snapshot was taken, or in response to the system receiving a request to terminate the development environment/cluster. At 1110, the system syncs git objects in the current development environment to a shared location on the network storage. At 1115, the system configures the git to fallback to using the shared location on the network storage as an alternate object storage location. At 1120, the system determines remaining files to be synced. At 1125, the system syncs the remaining files to the shared location on the network storage. At 1130, the system provides an indication that the snapshot is complete. At 1135, a determination is made as to whether process 1100 is complete. In some embodiments, process 1100 is determined to be complete in response to a determination that the development environment or cluster has been successfully snapshotted, no further development environments are to be snapshotted, the user has exited the system (e.g., the user exits the development environment that is provided by the cluster), an administrator indicates that process 1100 is to be paused or stopped, etc. In response to a determination that process 1100 is complete, process 1100 ends. In response to a determination that process 1100 is not complete, process 1100 returns to 1105.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing a development environment for a client system that runs on a cluster, comprising:
one or more processors configured to:
start the cluster from the client system to run the development environment, wherein starting the cluster includes instantiating the cluster based on a predefined cluster image, and configuring a set of dependencies for the cluster, wherein the set of dependencies includes a mounting for a network file storage, and configuring the set of dependencies includes copying the set of dependencies to the network file storage that is persisted through termination or subsequent starts of the development environment;
receive, via the development environment, code input to an interface with the client system;
determine to execute the code; and
in response to determining to execute the code, execute the code using the cluster including automatically scaling the cluster based on a workload for executing the code;
and
a memory coupled to the one or more processors and configured to provide the one or more processors with instructions.

2. The system of claim 1, wherein the set of dependencies are persisted for subsequent starts of the development environment.

3. The system of claim 1, wherein automatically scaling the cluster includes configuring each worker node of the cluster to use data stored on the network file storage.

4. The system of claim 3, wherein the data is persisted through termination or subsequent starts of the development environment.

5. The system of claim 3, wherein automatically scaling the cluster includes instantiating a new worker node for the cluster, comprising:
retrieving the set of dependencies from the network file storage; and
configuring the new worker node based at least in part on the set of dependencies.

6. The system of claim 1, wherein automatically scaling the cluster includes configuring each worker node of the cluster based on the set of dependencies stored to the network file storage that is persisted through termination or subsequent starts of the development environment.

7. The system of claim 1, wherein the code is persisted on the network file storage through at least one subsequent start of the development environment.

8. The system of claim 1, wherein the one or more processors are further configured to:
receive, from the client system, an access request to access the development environment; and
in response to receiving the access request,
cause the cluster associated with the development environment corresponding to the access request to start based at least in part on a corresponding cluster image.

9. The system of claim 8, wherein the access request comprises a user identifier for a user requesting access to the development environment.

10. The system of claim 9, wherein the one or more processors are further configured to determine the development environment based least in part on the user identifier.

11. The system of claim 10, wherein the development environment is persisted in association with the user identifier.

12. The system of claim 11, wherein persisting the development environment comprises capturing a snapshot of at least the development environment and storing the snapshot on the network file storage mounted to the cluster.

13. The system of claim 12, wherein the capturing of the snapshot is performed at predetermined intervals.

14. The system of claim 12, wherein the snapshot comprises information pertaining to the mounting to the network file storage and does not comprise network dependencies to third party services.

15. The system of claim 12, wherein the snapshot is stored in a compressed format.

16. The system of claim 1, wherein the network file storage comprises a working directory for the development environment.

17. The system of claim 1, wherein the one or more processors are further configured to:
determine whether a terminating criterion has been met; and
in response to determining that the terminating criterion has been met, terminate the development environment.

18. The system of claim 17, wherein the terminating the development environment includes terminating the cluster and persisting a state of the development environment for a subsequent start of the cluster.

19. The system of claim 1, wherein a set of predefined cluster images are pre-stored, and the predefined cluster image is selected based on a request to access the development environment.

20. The system of claim 1, wherein the development environment is configured to execute a set of code, wherein an operating system on which the set of code is developed is the same as an operating system on which the set of code is executed.

21. The system of claim 1, wherein the code is input by a user to a local development environment running on the client system, and the code is transmitted to the development environment running in the cluster when the user requests that the code be executed.

22. A method for providing a development environment for a client system that runs on a cluster, comprising:
  starting, by one or more processors, the cluster from the client system to run the development environment, wherein starting the cluster includes instantiating the cluster based on a predefined cluster image, and configuring a set of dependencies for the cluster, wherein the set of dependencies includes a mounting for a network file storage, and configuring the set of dependencies includes copying the set of dependencies to the network file storage that is persisted through termination or subsequent starts of the development environment;
  receiving, via the development environment, code input to an interface with the client system;
  determining to execute the code; and
  in response to determining to execute the code, executing the code using the cluster including automatically scaling the cluster based on a workload for executing the code.

23. A computer program product for providing a development environment for a client system that runs on a cluster, the computer program product being embodied in a non-transitory computer readable medium and comprising computer instructions for:
  starting, by one or more processors, the cluster from the client system to run the development environment, wherein starting the cluster includes instantiating the cluster based on a predefined cluster image, and configuring a set of dependencies for the cluster, wherein the set of dependencies includes a mounting for a network file storage, and configuring the set of dependencies includes copying the set of dependencies to the network file storage that is persisted through termination or subsequent starts of the development environment;
  receiving, via the development environment, code input to an interface with the client system;
  determining to execute the code; and
  in response to determining to execute the code, executing the code using the cluster including automatically scaling the cluster based on a workload for executing the code.

* * * * *